(12) United States Patent
Kuo (10) Patent No.: US 6,322,156 B1
(45) Date of Patent: Nov. 27, 2001

(54) WHEEL ASSEMBLY OF LUGGAGE

(75) Inventor: Chung-Hsien Kuo, Pan-Chiao (TW)

(73) Assignee: Chaw Khong Technology Co., Ltd., Taipei County (TW)

(*) Notice: Subject to any disclaimer, the term of this patent is extended or adjusted under 35 U.S.C. 154(b) by 0 days.

(21) Appl. No.: 09/512,056

(22) Filed: Feb. 24, 2000

(30) Foreign Application Priority Data

Sep. 2, 1999 (TW) ............................................. 88215014 U
Oct. 8, 1999 (TW) ....................................... 88215014A01 U (51) Int. Cl.[7] .......................... B60B 23/00; B60B 35/00; A45C 5/00
(52) U.S. Cl. ......................... 301/111; 301/125; 190/18 A
(58) Field of Search .............................. 301/5.3, 5.7, 5.1, 301/111, 125, 126; 16/30, 29, 31 R, 31 A, 43, 46; 190/18 A (56) References Cited

U.S. PATENT DOCUMENTS

5,134,753  8/1992  Rekuc ............................... 16/18 CG
5,295,565  3/1994  Latshaw ............................ 190/18 A

*Primary Examiner*—S. Joseph Morano
*Assistant Examiner*—Long Bao Nguyen
(74) *Attorney, Agent, or Firm*—Dougherty & Troxell (57) ABSTRACT

A wheel assembly of luggage comprises a hollow cylindrical bearing for wheel of luggage wherein the bearing is of durable and has a lubrication nature. The hollow cylindrical bearing is further employed in conjunction with two short hollow shafts for prevention a rotational friction between metal axle and wheel to significantly decrease the heat generated between metal axle and plastic wheel when operated, thereby obtaining a number of advantages such as quiet in use, no wheel deformation, reduction in manufacturing cost, and ease of assembly.

8 Claims, 9 Drawing Sheets

WHEEL ASSEMBLY OF LUGGAGE

BACKGROUND OF THE INVENTION

1. Field of the Invention

The present invention generally relates to a wheel assembly and more particularly to an improved bearing for wheeled luggage.

2. Description of Related Art

Conventionally, two metal bearings are provided in a wheel of luggage. But this is unsatisfactory because (1) it is relatively high in cost; and (2) it may produce loud sounds when operated. Typically, a metal bearing is not a high quality product required by luggage manufacturer because metal bearings for wheeled luggage do not operate so frequently as a machine bearing. Further, such metal bearings tend to become rusted after a long time of non-use. As such, wheeled luggage does not operate smoothly in most cases. Even worse, the loud sounds produced by a luggage rolling across a supporting surface in an airport often makes the traveler embarrassed.

A number of designs have been developed to eliminate the above deficiencies. For example, U.S. Pat. No. 5,134,753, entitled "Luggage Caster" and U.S. Pat. No. 5,295,565, entitled "Wheeled Luggage" both do not employ a metal bearing in the wheel assembly but rather wheel directly. Such designs are disadvantageous because a strong frictional resistance exists between the metal axle and the plastic wheel when luggage rolls across a supporting surface. worse, a considerable heat is generated between the metal axle and wheel when the luggage is loaded and transported a long distance which in turn tends to cause the bore to deform, thereby deactivating the wheel assembly.

Figure 11:
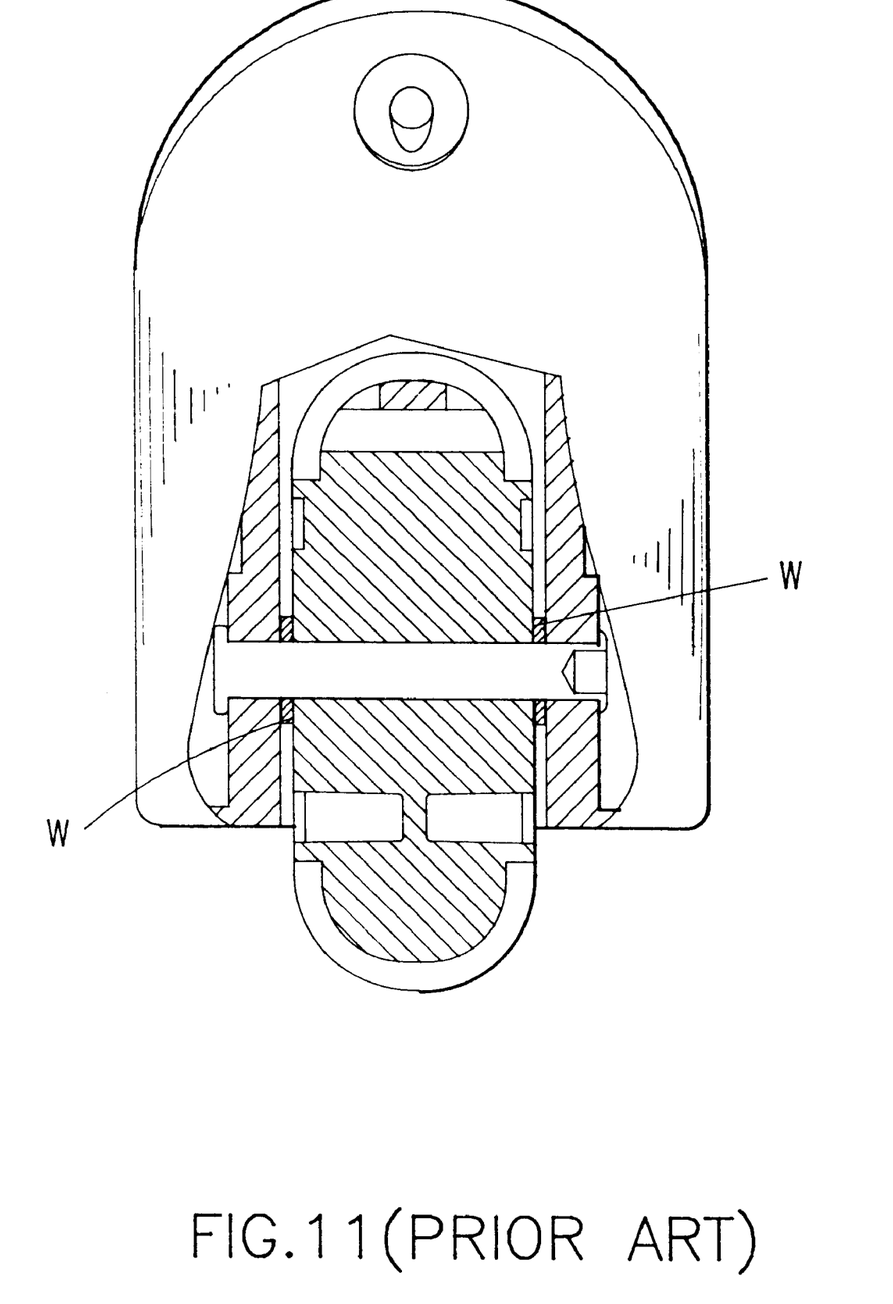
FIG. 11 is a sectional view of prior art wheel assembly.

An improved design that aims at solving the above problem is to mount two washers W on axle in either side of the wheel, i.e., between and attached to the wheel and the inner surface of the wheel mount as shown in FIG. 11. As such, neither side of the wheel is not in contact with the inner surface of wheel mount. Such washers W aim at decreasing the frictional resistance between the wheel assembly and the wheel mount. However, the above high heat disadvantage still exists when operated. As a result, the problem of deformed plastic wheel is unsolved.

Thus, it is desirable to provide an improved bearing for wheeled luggage in order to overcome the above drawbacks of prior art.

SUMMARY OF THE INVENTION

It is an object of the present invention to provide a bearing for wheeled luggage wherein a durable hollow cylindrical bearing unit is employed to replace conventional metal bearings for carrying out a rotational friction between axle and wheel, thereby obtaining a number of advantages such as quietness in use, no wheel deformation, reduction in manufacturing cost, and ease of assembly.

To achieve the above and other objects, the present invention provides a novel wheel assembly comprising a wheel mount having a central space, two holes on either side thereof; a wheel having a bore in the central portion; and an axle wherein a rotary hollow cylindrical bearing is inserted into the bore, a non-pivotable hollow shaft is further inserted into hollow cylindrical bearing, and axle is inserted through one side hole, bore, and the other side hole to mount wheel to the wheel mount such that no rotational friction between the wheel and axle occurs when wheel is rotating.

The above and other objects, features and advantages of the present invention will become apparent from the following detailed description taken with the accompanying drawings.

DETAILED DESCRIPTION OF THE PREFERRED EMBODIMENTS

Figure 1:
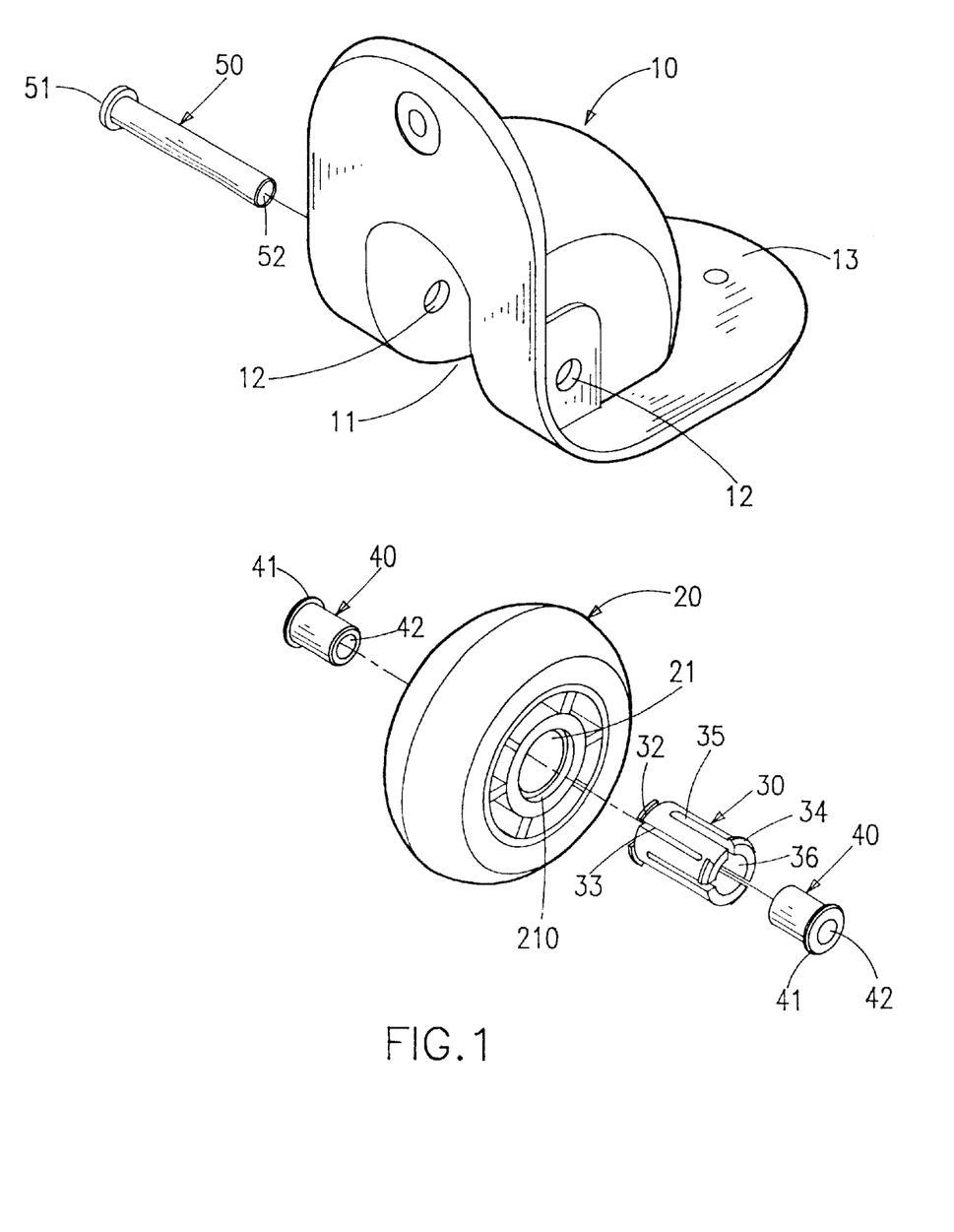
FIG. 1 is an exploded view of a wheel assembly in accordance with a first embodiment of the present invention.

Referring to FIG. 1, there is shown a wheel assembly constructed in accordance with the first embodiment of the invention comprising a wheel mount 10 having a central space 11, two holes 12 on either side thereof; a wheel 20 having a bore 21 and an axle 50. In one aspect of the invention a hollow cylindrical bearing 30 made of durable plastics is employed to replace conventional metal bearings for carrying out a rotational friction between axle 50 and wheel 20. As shown, there are three slot-like recesses 33 formed from left to right and three slot-like recess 35 formed from right to left in the circumferential surface of hollow cylindrical bearing 30 in which each slot-like recess 33 is located between two slot-like recesses 35 and vice versa. It is seen that the length of each of recesses 33 and 35 is smaller than that of the bearing 30. Further, such recesses 33 and 35 allow bearing 30 to change its diameter when a force is exerted on the surface thereof. Furthermore, three risers 32 are protruded on the left circumferential edge and three risers 34 are protruded on the right circumferential edge respectively in which each of risers 32 corresponds to a slot-like recess 33 and each of risers 34 corresponds to a slot-like recess 35. The outer diameter of each of risers 32 and 34 is larger than the bore 21 and is equal to the inner diameter of the shoulder 210. A circumferential flange 41 is formed on the external end of hollow shaft 40. The outer diameter of circumferential flange 41 is larger than the bore 36 of hollow cylindrical bearing 30. The outer diameter of the cylindrical body of hollow shaft 40 is equal to (or a little bit smaller than) the inner diameter of the bore 36 of hollow cylindrical bearing 30.

Figure 2:
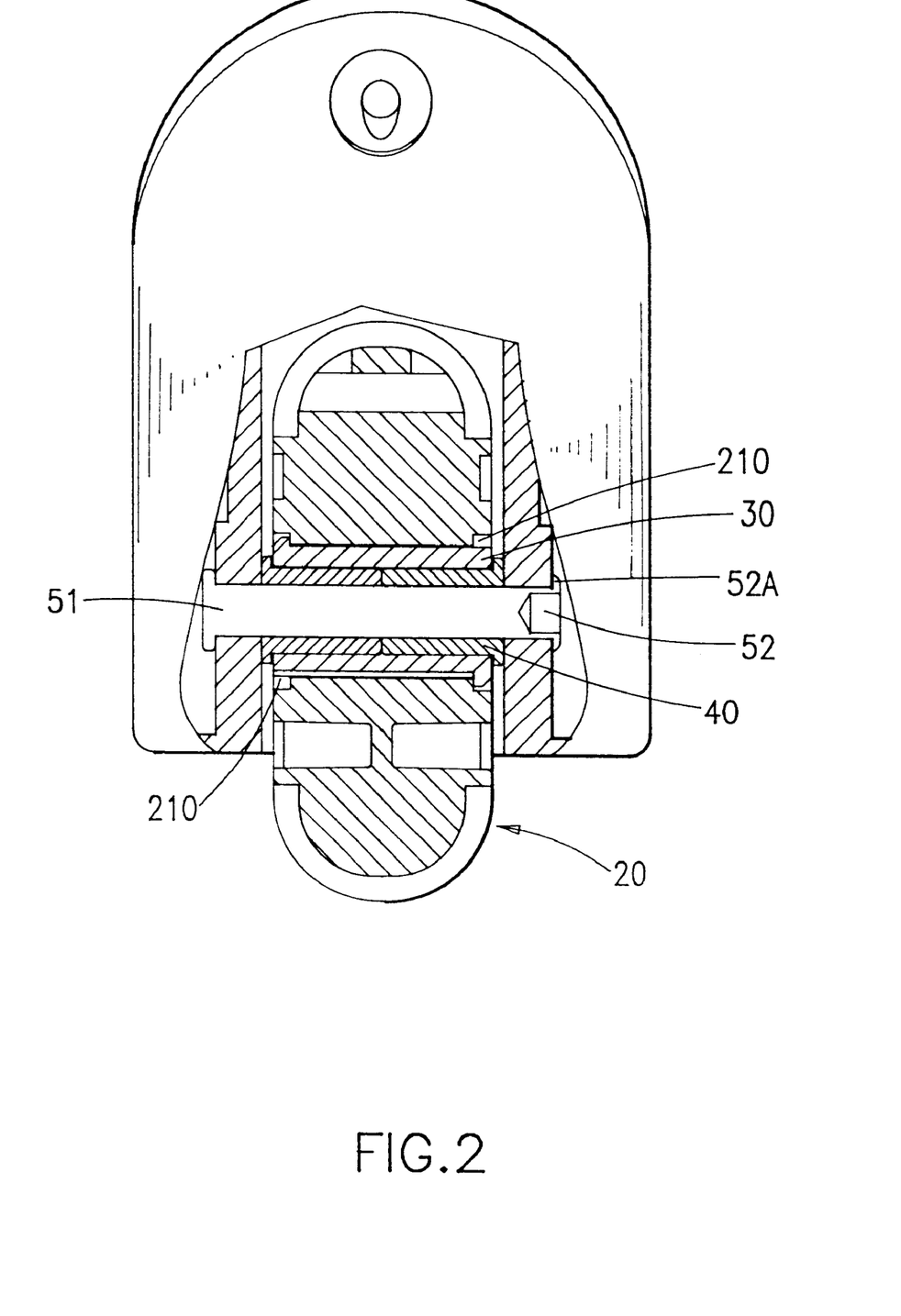
FIG. 2 is a sectional view of FIG. 1.

FIG. 2 illustrates the assembly process of the wheel shown in FIG. 1. First, apply a contraction force on the circumferential surface of hollow cylindrical bearing 30 to make the outer diameter of risers 32 slightly smaller than the bore 21 if the assembly process begins from right side of wheel as shown. Then insert hollow cylindrical bearing 30 into bore 21 until risers 32 and 34 engage against the inner surfaces of shoulders 210 respectively. As shown, the shoulders 210 are flush with risers 32 and 34. Then insert hollow shafts 40 into the hollow cylindrical bearing 30 from both sides. Then put wheel 20 in the space 11. Then insert axle 50 through one side hole 12, bore 21, and the other hole 12 to mount wheel 20 to the wheel mount 10 until the head 51 of axle 50 engages against one outer surface of wheel mount 10. Finally, hammer the other recessed end 52 into an enlarged portion 52A to lock axle 50 into place in order to form a complete wheel assembly.

As shown, hollow cylindrical bearing 30 is secured to hollow shafts 40. Further, there is a small gap between hollow cylindrical bearing 30 and bore 21 as such there is a rotational friction between hollow cylindrical bearing 30 and bore 21 as well as a rotational friction between hollow cylindrical bearing 30 and hollow shafts 40 and no rotational friction between the wheel 20 and axle 50 when wheel 20 is rotating. Additionally, hollow cylindrical bearing 30 and hollow shafts 40 are made of hard durable thermoplastic and have a lubrication nature. It is found by the inventor that hollow cylindrical bearing 30 and hollow shafts 40 nearly have the same performance as the conventional metal bearing.

Figure 3:
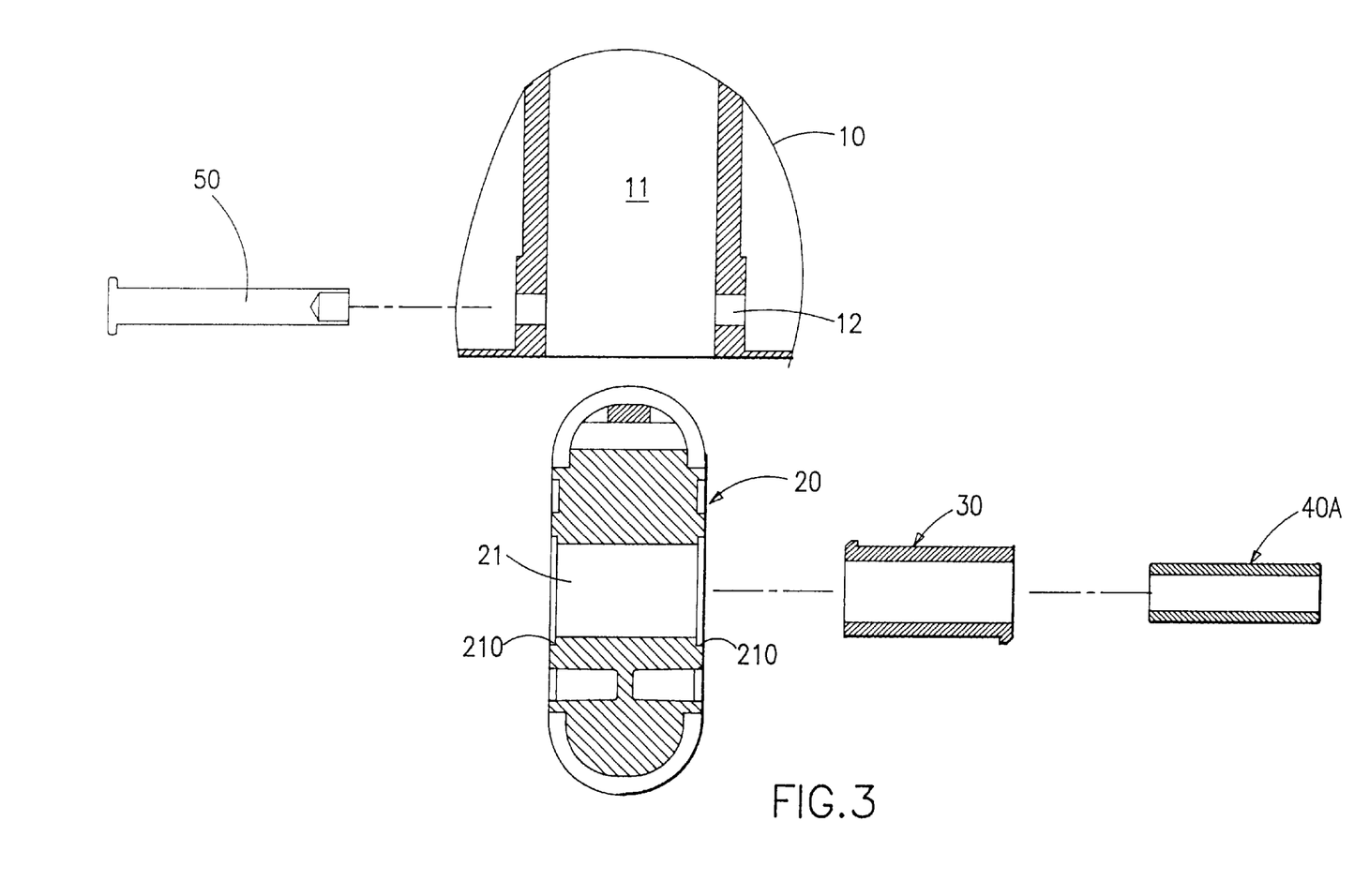
FIG. 3 is an exploded sectional view of a wheel assembly in accordance with a second embodiment of the present invention.
Figure 4:
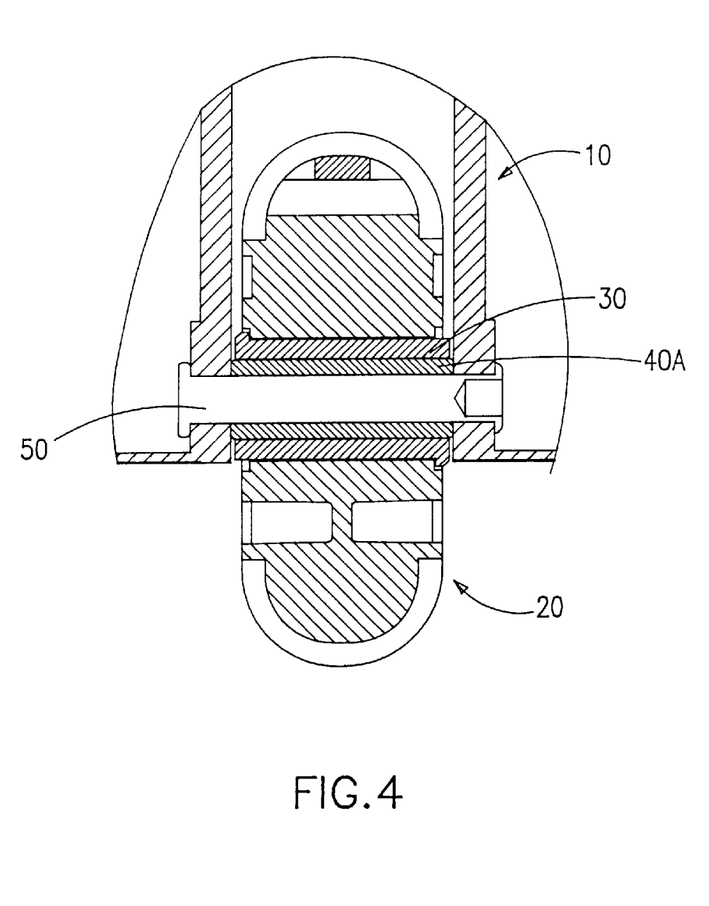
FIG. 4 is a sectional view of FIG. 3.

Referring to FIGS. 3 and 4, there is shown a wheel assembly constructed in accordance with the second embodiment of the invention. This embodiment is generally configured the same as the first embodiment and thus only the difference therebetween is described below. The difference is that two short hollow shafts 40 are replaced by a single hollow shaft 40A having the same length as hollow shafts 40. The assembled wheel assembly is shown in FIG. 4 in which hollow shaft 40A has the same functionality as hollow shafts 40 shown in FIG. 2.

Figure 5:
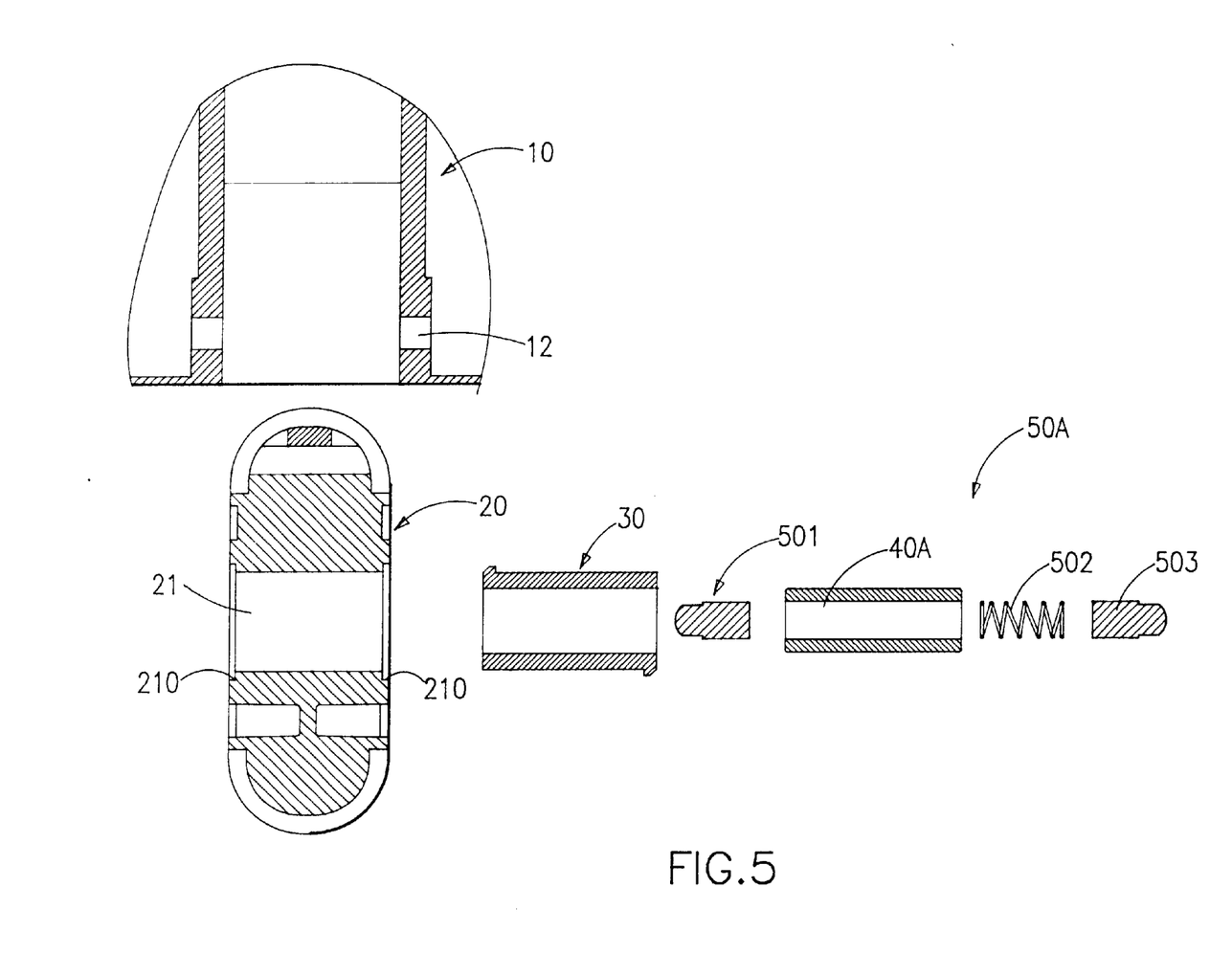
FIG. 5 is an exploded sectional view of a wheel assembly in accordance with a third embodiment of the present invention.
Figure 6:
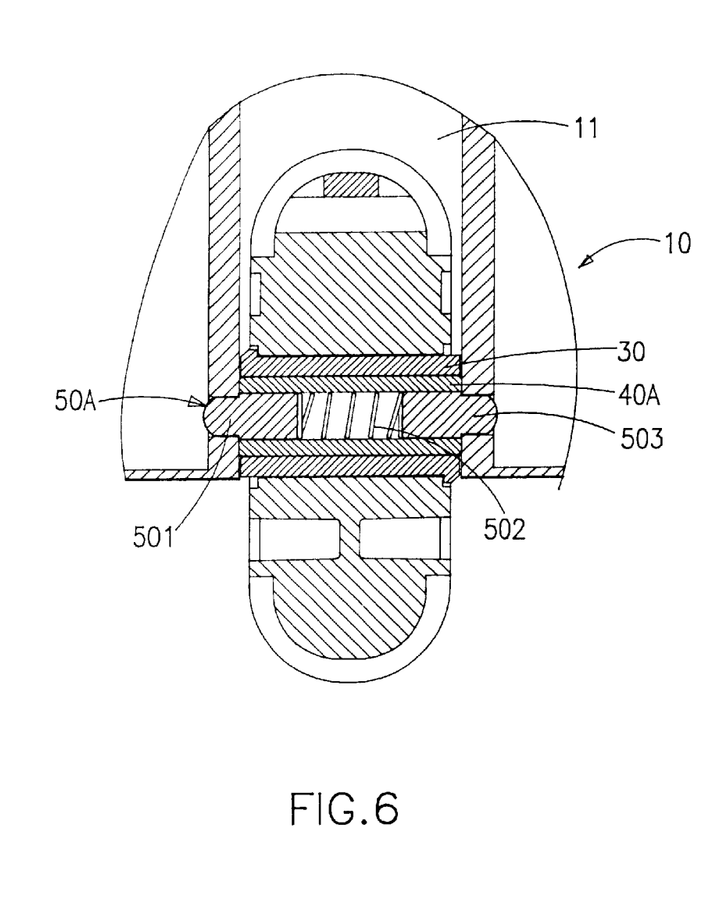
FIG. 6 is a sectional view of FIG. 5.

Referring to FIGS. 5 and 6, there is shown a wheel assembly constructed in accordance with the third embodiment of the invention. This embodiment is generally configured the same as the second embodiment and thus only the difference therebetween is described below. The difference is that axle 50 is replaced by a novel axle 50A consisting of a left axle section 501, a spring 502, and a right axle section 503. Thus, no riveting operation is required for the axle 50A thus easing assembly.

Figure 7:
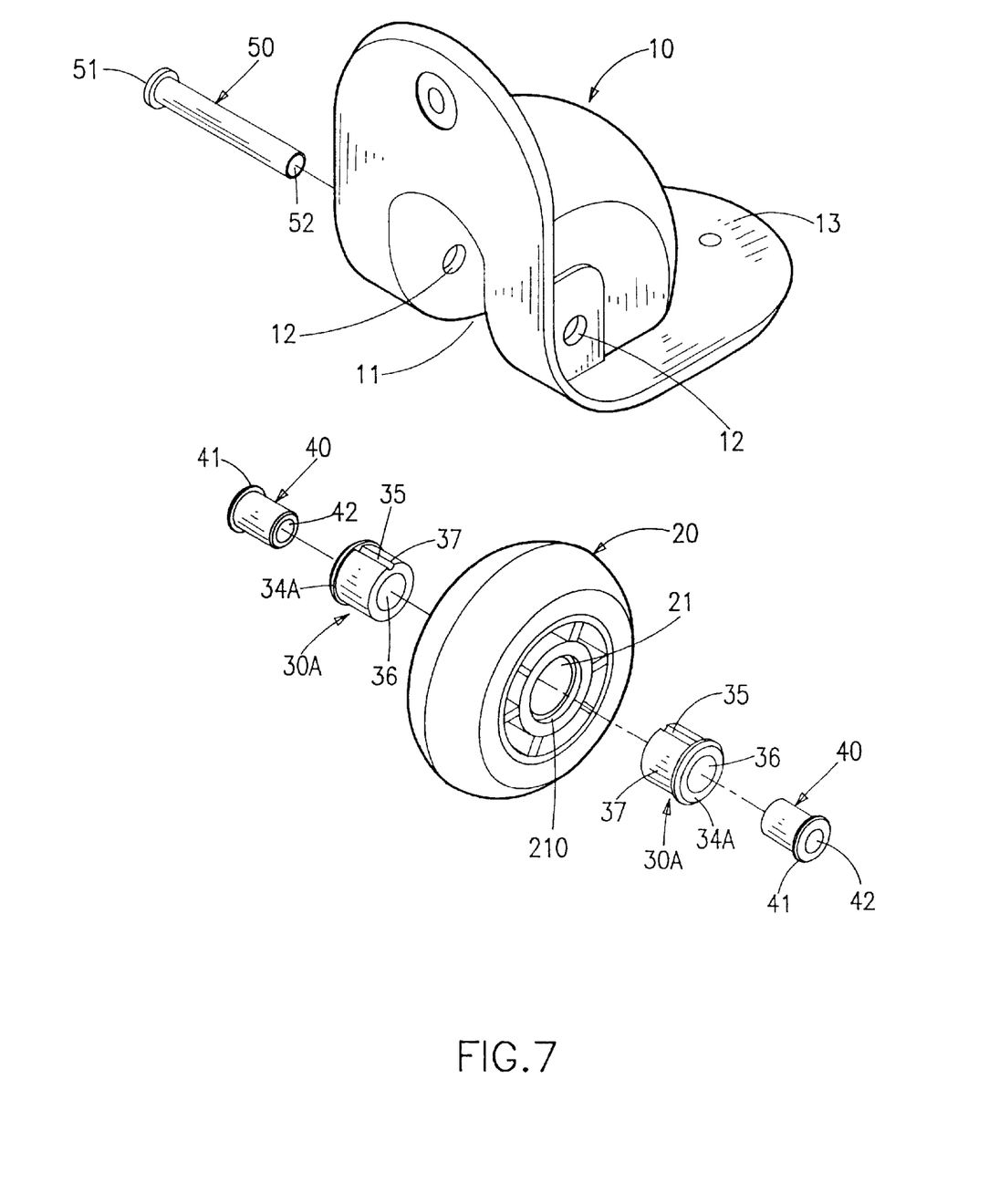
FIG. 7 is an exploded view of a wheel assembly in accordance with a fourth embodiment of the present invention.
Figure 8:
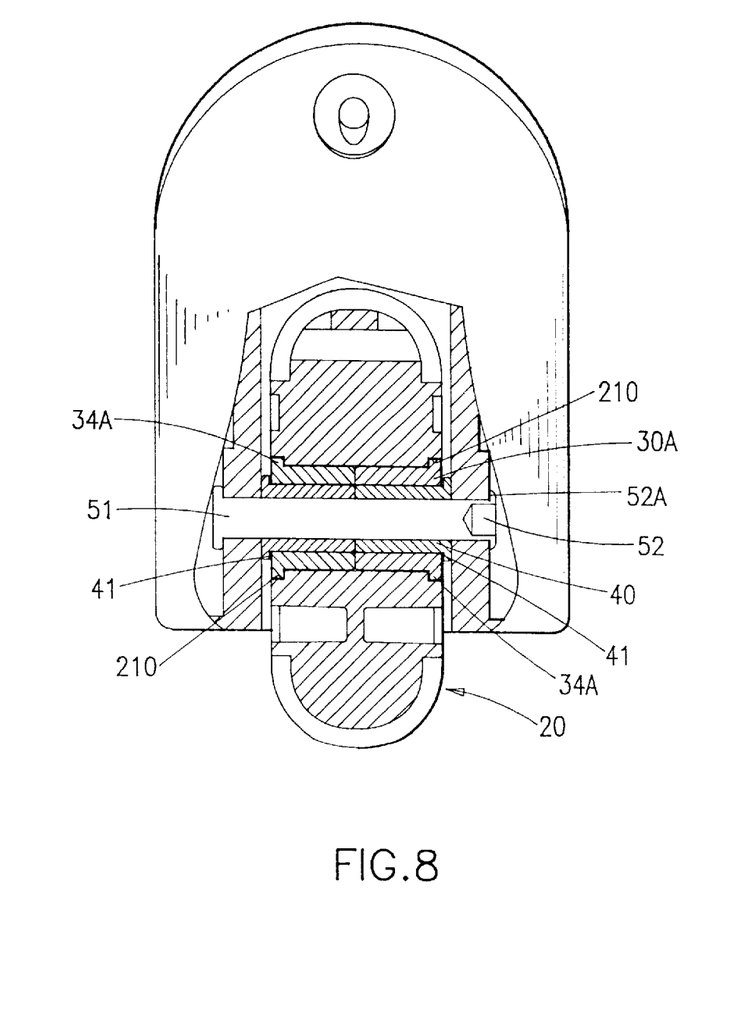
FIG. 8 is a sectional view of FIG. 7.

Referring to FIGS. 7 and 8, there is shown a wheel assembly constructed in accordance with the fourth embodiment of the invention. This embodiment is generally configured the same as the first embodiment and thus only the difference therebetween is described below. The difference is that the slot-like recesses 32 and 34 oh the circumferential surface 37 of hollow cylindrical bearing 30 in the first embodiment are replaced by two smooth circumferential surfaces 37 of hollow cylindrical bearings 30A. Thus, two separate insertions of hollow cylindrical bearing 30A into bore 21 are required. If necessary, a number of axial grooves 35 are provided on the circumferential surface 37 of hollow cylindrical bearings 30A as shown in FIG. 7. These grooves 35 may be filled with lubricating oil so as to further reduce rotational friction between wheel 20 and hollow cylindrical bearing 30A. As the rest of assembly process and the functionality of such wheel assembly are generally the same as the first embodiment, a detailed description thereof will be omitted herein for the sake of brevity.

Figure 9:
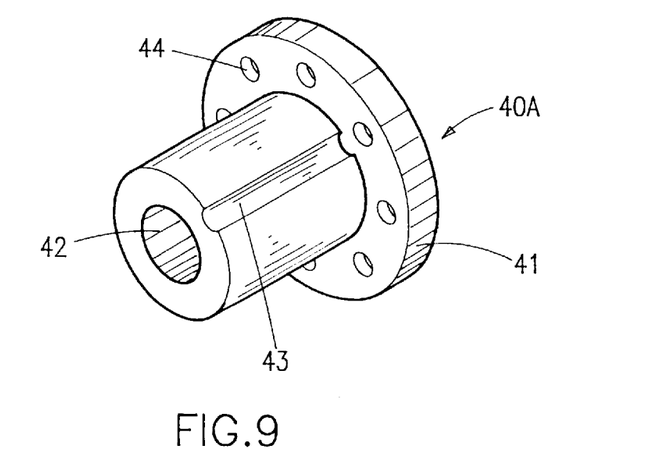
FIG. 9 is a perspective view of a hollow shaft in accordance with a fifth embodiment of the present invention.

Referring to FIG. 9, there is shown a hollow shaft constructed in accordance with the fifth embodiment of the invention. Other components of the wheel assembly of this embodiment are omitted herein for the sake of brevity. This embodiment is general configured the same as fourth embodiment and only a different therebetween is described below The difference is that a number of axial grooves 43 are provided on the circumferential surface of hollow shaft 40A. These grooves 43 are filled with lubricating oil so as to further reduce rotational friction between the hollow shaft 40A and the hollow cylindrical bearing 30. Moreover, if available, a number of annular cavities 44–44 may be further provided on the inner side of circumferential flange 41 of hollow shafts 40. These cavities 44–44 may be filled with lubricating oil (or served as a dust collector) so as to further reduce rotational friction between the hollow shaft 40A and the hollow cylindrical bearing 30 and 30A.

Figure 10:
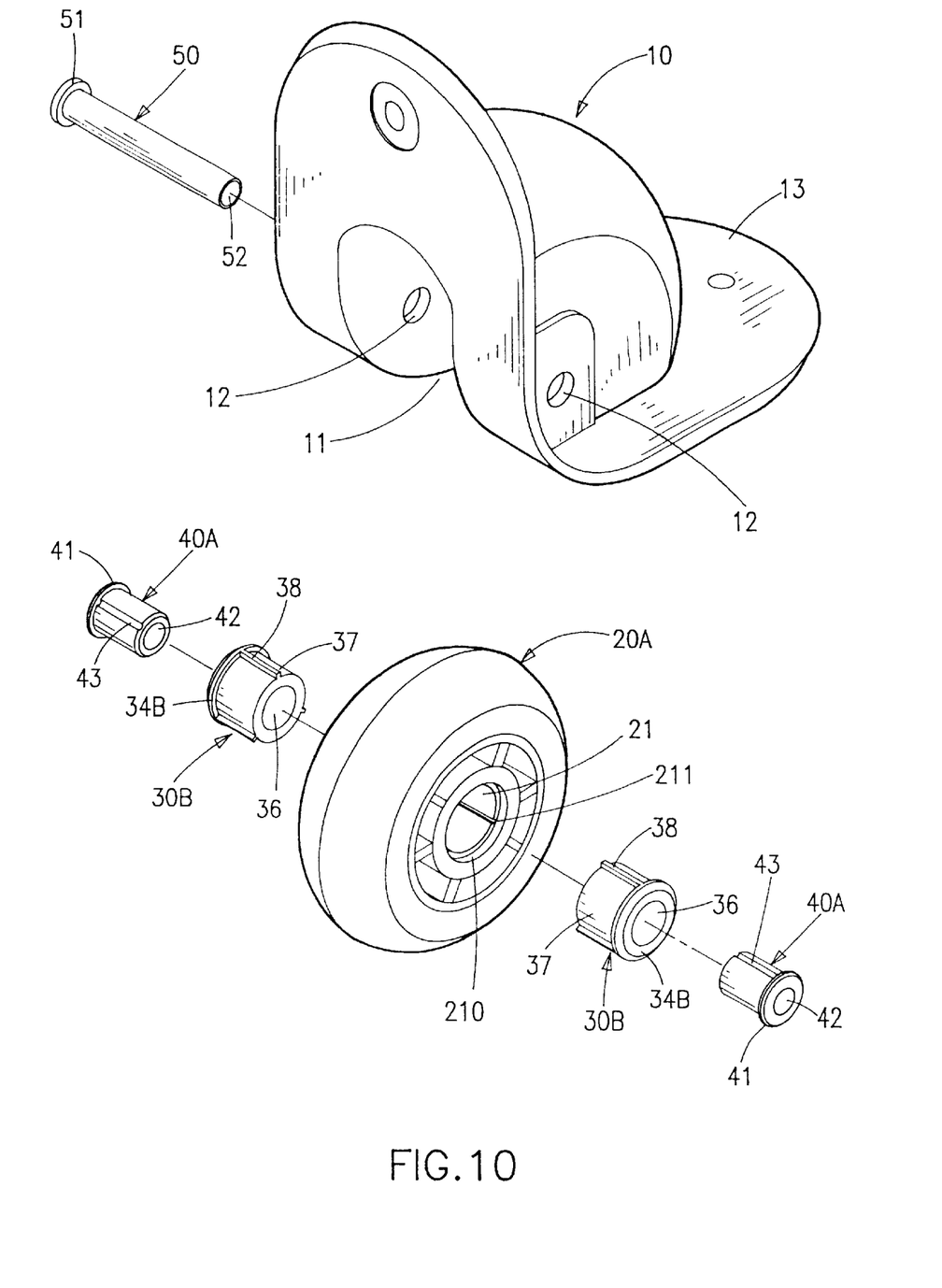
FIG. 10 is an exploded view of a wheel assembly in accordance with a sixth embodiment of the present invention.

Referring to FIG. 10, there is shown a wheel assembly constructed in accordance with the sixth embodiment of the invention. This embodiment is generally configured the same as the fourth embodiment and thus only the differences therebetween are described below The differences are that a number of grooves 35 on the hollow cylindrical bearing 30A of fourth embodiment are replaced by a number of axial elongate projections 38 provided on the circumferential surface 37 of hollow cylindrical bearing 30B and the same number of corresponding axial elongate recesses 211 provided on the inner surface of bore 21 of wheel 20A for receiving the projections 38 when assembled. As such, the wheel 20A and the hollow cylindrical bearings 30B are combined with one unit and the hollow shafts 40A and the axle 50 firmly fixed together as another one unit, the only rotational friction relationship is existed between the hollow cylindrical bearings 30B and the hollow shafts 40A obtaining a same function of the first embodiment as mentioned above. Of course a number of axial grooves 43 may be further provided on the outer surface of cylindrical portion of the hollow shaft 40A and the grooves 43 may be filled with lubricating oil so as to further reduce rotational friction between the hollow shaft 40A and the hollow cylindrical bearing 30B as mentioned above.

While the invention herein disclosed has been described by means of specific embodiments, numerous modifications and variations could be made thereto by those skilled in the art without departing from the scope of the invention set forth in the claims.

What is claimed is:

1. A wheel assembly for luggage comprising:
    a) a wheel mount having a central space and aligned holes on opposite sides of the central space;
    b) a wheel located in the central space, the wheel having a first central bore;
    c) a plastic rotary hollow cylindrical bearing located in the central bore of the wheel, the plastic cylindrical bearing having a second central bore and at least a portion with an outer diameter less than a diameter of the first central bore wherein the hollow cylindrical bearing further having a plurality of first recesses extending from a first end and a plurality of second recesses extending from a second end in an outer surface of the bearing, each of the plurality of first recesses is located between adjacent ones of the plurality of second recesses and each of the plurality of second recesses is located between adjacent ones of the plurality of first recesses, and a length of each of the recesses is smaller than a length of the bearing, thereby allowing the bearing to reduce its diameter when a force is exerted on the surface thereof;
    d) a hollow shaft located in the second central bore of hollow cylindrical bearing, the hollow shaft having a third central bore; and,
    e) an axle engaging the third central bore and the aligned holes of the wheel mount to rotatably attach the wheel to the wheel mount such that no rotational friction occurs between the wheel and the axle.

2. A wheel assembly for luggage comprising:
   a) a wheel mount having a central space and aligned holes on opposite sides of the central space;
   b) a wheel located in the central space, the wheel having a first central bore;
   c) a plastic rotary hollow cylindrical bearing located in the central bore of the wheel, the plastic cylindrical bearing having a second central bore and at least a portion with an outer diameter less than a diameter of the first central bore;
   d) a hollow shaft located in the second central bore of hollow cylindrical bearing, the hollow shaft having a third central bore wherein the hollow shaft comprises two separate sections, each with a circumferential flange formed on an end thereof; and,
   e) an axle engaging the third central bore and the aligned holes of the wheel mount to rotatably attach the wheel to the wheel mount such that no rotational friction occurs between the wheel and the axle.

3. The wheel assembly of claim 2, wherein each of the circumferential flanges of the hollow shaft engages against an end of the hollow cylindrical bearing.

4. The wheel assembly of claim 3, wherein a rotational friction difference exists between the rotational friction of the bearing and the bore and the rotational friction of the shaft and the bearing.

5. A wheel assembly for luggage comprising:
   a) a wheel mount having a central space and aligned holes on opposite sides of the central space;
   b) a wheel located in the central space, the wheel having a first central bore;
   c) a plastic rotary hollow cylindrical bearing located in the central bore of the wheel, the plastic cylindrical bearing having a second central bore and at least a portion with an outer diameter less than a diameter of the first central bore, wherein the hollow cylindrical bearing comprises two separate sections, each section having at least a portion with an outer diameter smaller than a diameter of the first central bore;
   d) a hollow shaft located in the second central bore of hollow cylindrical bearing, the hollow shaft having a third central bore and wherein the hollow shaft comprises two separate sections, each with a circumferential flange formed on an end thereof, each of the circumferential flanges of the hollow shaft engages against an end of the hollow cylindrical bearing; and,
   e) an axle engaging the third central bore and the aligned holes of the wheel mount to rotatably attach the wheel to the wheel mount such that no rotational friction occurs between the wheel and the axle.

6. The wheel assembly of claim 5, wherein a rotational friction difference exists between the rotational friction of the bearing and the bore and the rotational friction of the shaft and the bearing.

7. A wheel assembly for luggage comprising:
   a) a wheel mount having a central space and aligned holes on opposite sides of the central space;
   b) a wheel located in the central space, the wheel having a first central bore;
   c) a plastic rotary hollow cylindrical bearing located in the central bore of the wheel, the plastic cylindrical bearing having a second central bore and at least a portion with an outer diameter less than a diameter of the first central bore wherein the hollow cylindrical bearing comprises two separate sections, each section having at least a portion with an outer diameter smaller than a diameter of the first central bore, each section of the hollow cylindrical bearing comprises a circumferential riser protruding on one side thereof and the wheel comprises two shoulder portions adjacent to either end of the first central bore, each of the shoulder portions having an inner diameter larger than that of the bore such that the circumferential risers of the bearing engage against the shoulder portions;
   d) a hollow shaft located in the second central bore of hollow cylindrical bearing, the hollow shaft having a third central bore;
   e) an axle engaging the third central bore and the aligned holes of the wheel mount to rotatably attach the wheel to the wheel mount such that no rotational friction occurs between the wheel and the axle; and,
   f) a plurality of second axial grooves provided on a circumferential surface of the hollow cylindrical bearing filled with lubricating oil.

8. A wheel assembly for luggage comprising:
   a) a wheel mount having a central space and aligned holes on opposite sides of the central space;
   b) a wheel located in the central space, the wheel having a first central bore;
   c) a plastic rotary hollow cylindrical bearing located in the central bore of the wheel, the plastic cylindrical bearing having a second central bore and at least a portion with an outer diameter less than a diameter of the first central bore wherein the hollow cylindrical bearing comprises two separate sections, each section having at least a portion with an outer diameter smaller than a diameter of the first central bore;
   d) a hollow shaft located in the second central bore of hollow cylindrical bearing, the hollow shaft having a third central bore wherein the hollow shaft comprises two separate sections, each with a circumferential flange formed on an end thereof; and,
   e) an axle engaging the third central bore and the aligned holes of the wheel mount to rotatably attach the wheel to the wheel mount such that no rotational friction occurs between the wheel and the axle.

* * * * *